United States Patent

Mouneydiere

[15] 3,691,962

[45] Sept. 19, 1972

[54] BOGIES OR CHASSIS FOR ROLLING STOCK WITH A PLURALITY OF AXLES

[72] Inventor: Robert Mouneydiere, Le Perreux-sur-Marne, France

[73] Assignee: Creusot-Loire, Seine, France

[22] Filed: May 17, 1971

[21] Appl. No.: 144,071

[52] U.S. Cl. .............................. 105/182 R, 105/453
[51] Int. Cl. ............................................... B61f 5/38
[58] Field of Search ... 104/182, 183, 196, 199 R, 453

[56] References Cited

UNITED STATES PATENTS

| | | | |
|---|---|---|---|
| 1,656,995 | 1/1928 | Wenzel | 105/183 |
| 2,089,110 | 8/1937 | Bugatti | 105/199 R X |
| 3,013,507 | 12/1961 | Stein | 105/182 R |
| 3,212,456 | 10/1965 | Dilworth et al. | 105/199 R X |

FOREIGN PATENTS OR APPLICATIONS 68,501  10/1944  Norway ..................... 105/196

*Primary Examiner*—Gerald M. Forlenza
*Assistant Examiner*—Frank E. Werner
*Attorney*—Cameron, Kerkam & Sutton

[57] ABSTRACT

A bogie for rolling stock includes a plurality of groups of axles, of which at least one is a steering axle group. A non-load bearing T-shaped draught bar is pivotally connected at one end to the bogie chassis, with each of the two arms of the T resting on one axlebox of the steering axle. Load supporting beams between the steering axle and the adjacent axle of the steering axle group bear on the axleboxes of the steering axle in a manner permitting inclination of the beams with steering or on a canted track; with well-defined inclination of the axleboxes of the steering axle according to the draught bar being ensured by guide rods linking each axlebox to its beam.

1 Claim, 6 Drawing Figures

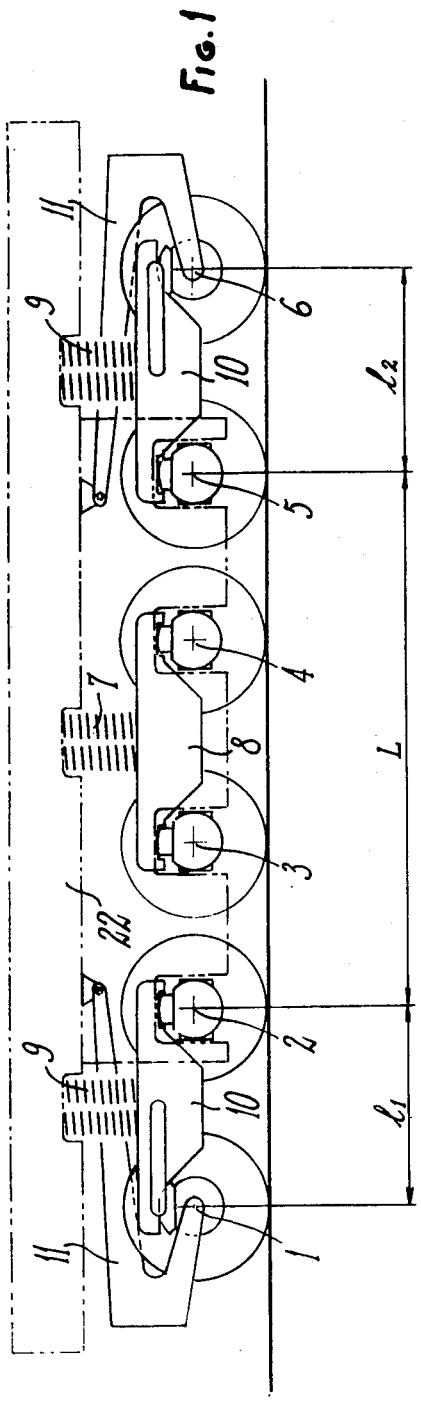
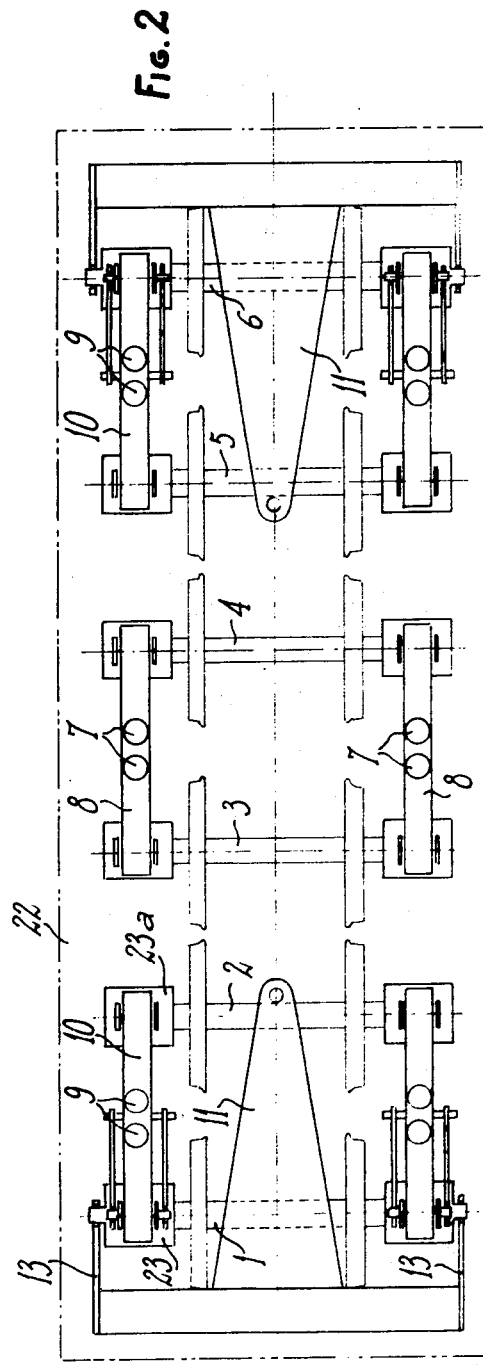

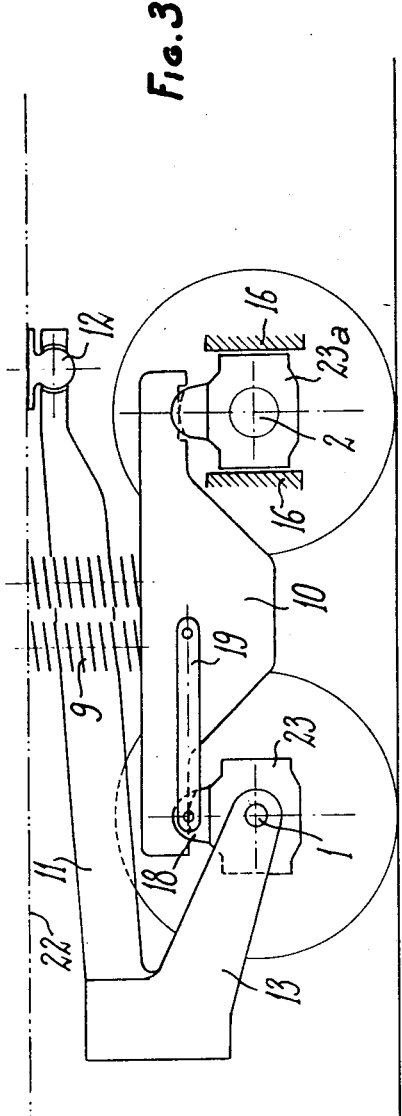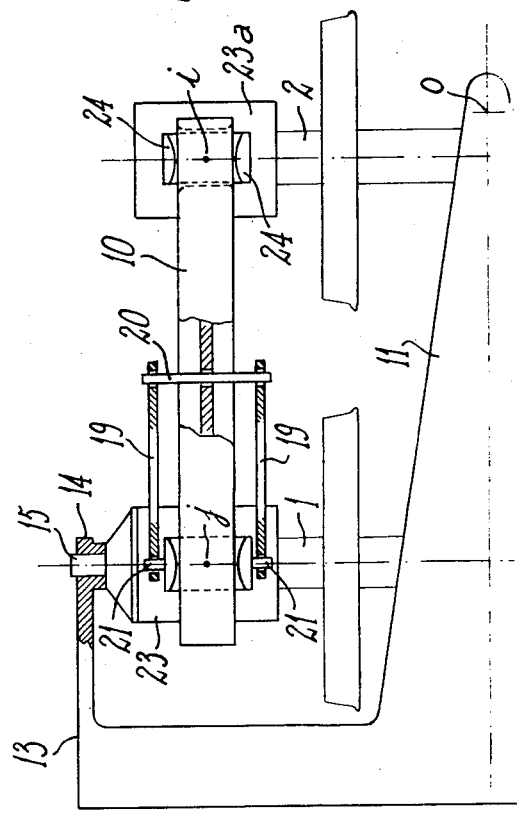

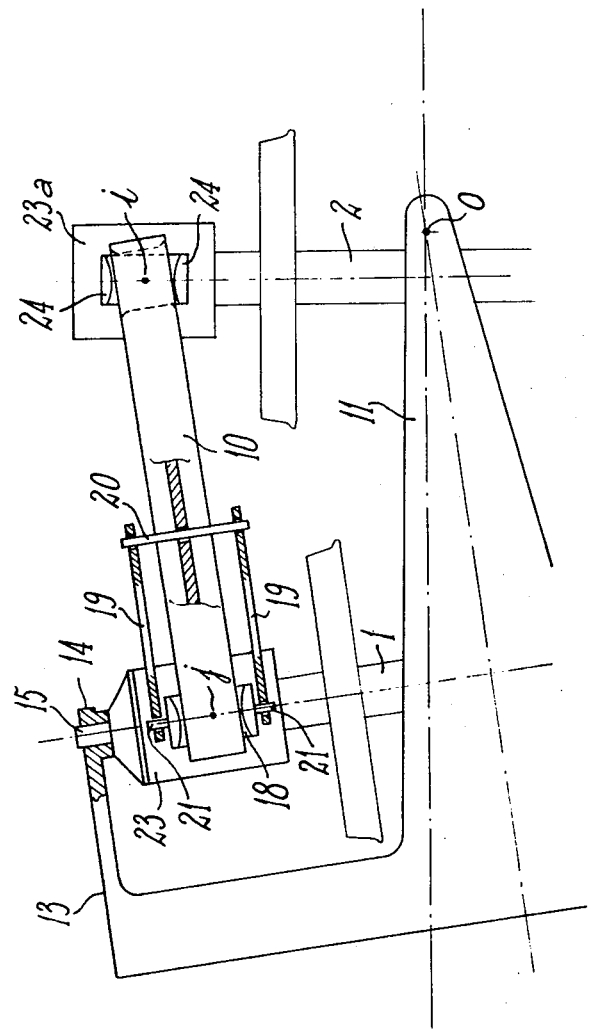

BOGIES OR CHASSIS FOR ROLLING STOCK WITH A PLURALITY OF AXLES

DESCRIPTION OF THE INVENTION

The invention relates to bogies or chassis for rolling stock, with a plurality of axles and therefore a large wheelbase between the end axles. It is intended to provide bogies of this type with adjustable axles which can be used as steering axles if at one end of the bogie or chassis.

In most of the various known systems of steering axles, the two distinct functions of steering and suspension are performed by the same components, which has disadvantages. The invention, however, has a dual object: to allocate the steering function and the suspension functions to two different components; and to accommodate very heavy loads by making the axlebox perform as a roller, so permitting translation of the load-bearing beam.

To this end, the invention consists of a bogie with adjustable or steering axles and controlled load distribution, comprising a plurality of groups of axles, at least one of these axle groups being a steering axle group, characterized in that the or each steering axle group comprises in combination: a T-shaped draught bar pivoted at one end on the bogie chassis and on the bogie axis, each of the two arms of the T at its other end resting on one axlebox of the steering axle; two beams supporting the load by way of springs and each bearing at one end on one axlebox of the non-steering axle in such a way as to permit inclination of the beams and at the other end on a cylindrical bearing surface concentric with the steering axle and attached to an axlebox of the said axle so that this end can run on the cylindrical bearing surface on curved or canted railway track; and four guide rods (two per beam) of which each is connected to the central portion of the associated bean and to one of the axleboxes on the steering axle, these guide rods ensuring well-defined inclination of each of the two axleboxes of the steering axle according to the draught-bar pivoting angle at all times.

For better comprehension of the invention and its advantages, a bogie embodying the invention, with six axles arranged in three pairs, only the first and last of the six axles being steering axles, will now be described by way of example only.

This description refers to the accompanying drawings, in which:

FIG. 1 is an elevation of the entire bogie;
FIG. 2 is a plan view relating to FIG. 1;
FIG. 3 is an elevation of one of the two end pairs of axles on a straight portion of track;
FIG. 4 is a plan view relating to FIG. 3;
FIG. 5 shows a detail; and
FIG. 6 is a plan view of one of the two end pairs of axles on curved track.

In the embodiment illustrated, the chassis has six axles, the end axles 1 and 6 being both carrying and steering axles and the intermediate axles 2 to 5 being only carrying axles and connected longitudinally to the chassis by the conventional axle guard system. The rigid wheelbase of the bogie is L, whereas the variable end wheelbases are $l_1$ and $l_2$. The loads are distributed over the axles in groups of two, the axles 3 and 4 supporting their load portion by way of springs 7 and beams 8. The axles 1, 2 and 5, 6 are loaded by way of springs 9 and beams 10.

The flexibility of the springs 7 and 9 is selected so as to ensure controlled distribution of the loads over the axles.

The steering function of each of the axles 1 and 6 is performed by a draught bar 11 (see FIGS. 3 ff) which is not load-bearing. This draught bar is pivoted on the bogie chassis 22 by means of a ball joint 12 and is connected to the axleboxes 23 by two arms 13, whose ends carry bearings 14 engaged by pins 15 fixed to the axleboxes.

The axle can therefore pivot about the center O (FIGS. 4, 6) and assume the inclinations demanded by the suspension and by warped track, the longitudinal stresses being transmitted to the bogie chassis by the draught bar 11.

One end of the beam 10 bears on the axlebox 23a of the axle 2, which is connected longitudinally to the bogie chassis by the axle guard guides 16. The beam bears on the axlebox between two abutments 24 with rounded surfaces. The beam 10 can therefore incline by pivoting about a point $i$ according to the position of the axle 1.

The other end of the beam 10 bears on the axlebox 23 of the axle 1, contact being made at a point $j$ with a cylindrical bearing surface 18 concentric with the axle.

Guide rods 19 are connected to the beam 10 by a pivot 20 and to the axlebox 23 by pivots 21. These pivots 21 are situated on the running surface of the cylindrical portion 18.

When the steering axle 1 inclines due to a curve in the track, the distance $ij$ separating the points at which the beam 10 is supported shorten or lengthen. The axlebox 23 inclines (FIG. 6) due to the force arising from contact between the beam and the running surface 18. The end of the beam runs on the cylindrical surface 18, and the box 23 acts as a roller rotating on this end of the beam.

The guide rods 19 are a safety measure designed to ensure well-defined inclination of the axlebox at all times according to the pivoting angle of the draught bar 10, the box therefore being guided positively by the beam.

The springs 9 must be long enough to permit displacement of the beam 10 by transverse deformation, without producing any opposing return forces which might interfere with operation of the apparatus.

Obviously, the invention is not restricted to the embodiment described and illustrated, but may give rise to assorted variants.

I claim:

1. A bogie with adjustable or steering axles and controlled load distribution, comprising a plurality of groups of axles, at least one of these axle groups being a steering axle group, characterized in that the or each steering axle group comprises in combination: a T-shaped draught bar pivoted at one end on the bogie chassis and on the bogie axis, each of the two arms of the T at its other end resting on one axlebox of the steering axle; two beams supporting the load by way of springs and each bearing at one end on one axlebox of the non-steering axle in such a way as to permit inclination of the beams and at the other end on a cylindrical bearing surface concentric with the steering axle and attached to an axlebox of the said axle so that this end can run on the cylindrical bearing surface on curved or canted railway track; and four guide rods (two per beam) of which each is connected to the central portion of the associated beam and to one of the axleboxes on the steering axle, these guide rods ensuring well-defined inclination of each of the two axleboxes of the steering axle according to the draught-bar pivoting angle at all times.

* * * * *